United States Patent [19]

Pavlin et al.

[11] 3,927,565
[45] Dec. 23, 1975

[54] APPARATUS AND METHOD FOR MEASURING THE MASS FLOW OF A FLUID STREAM

[75] Inventors: Cyrille Francois Pavlin, Septeuil; Gerard Mantoux, Bois D'Arcy; Adrien Giraud, Neuilly-sur-Seine; Michele Grossin, Rueil-Malmaison, all of France

[73] Assignees: Bertin & Cie, Plaisir; Compagnie Francaise des Petroles, Paris, both of France

[22] Filed: Jan. 29, 1974

[21] Appl. No.: 437,742

[30] Foreign Application Priority Data
Jan. 30, 1973  France .................. 73.03196

[52] U.S. Cl. ............................................. 73/194 M
[51] Int. Cl.[2] .................................................. G01F 1/84
[58] Field of Search .................. 73/194 B, 194 M

[56] References Cited
UNITED STATES PATENTS

| | | | |
|---|---|---|---|
| 2,564,416 | 8/1951 | Wildhack | 73/141 |
| 2,934,951 | 5/1960 | Li | 73/194 |
| 3,080,750 | 3/1963 | Wiley et al. | 73/194 |
| 3,116,639 | 1/1964 | Bird | 73/194 |
| 3,218,851 | 11/1965 | Sipin | 73/194 |
| 3,329,019 | 7/1967 | Sipin | 73/194 |
| 3,355,944 | 12/1967 | Sipin | 73/194 |
| 3,396,579 | 8/1968 | Souriau | 73/194 |

*Primary Examiner*—Herbert Goldstein
*Attorney, Agent, or Firm*—A. W. Breiner

[57] ABSTRACT

Apparatus for measuring the mass flow of a stream of single-phase or polyphase fluid comprises in combination a substantially rectilinear pipe segment open at both ends and rotatable around an axis other than and not parallel to its longitudinal axis, means for rotating the pipe segment through a large angle about its rotational axis, means for making the fluid flow through the pipe segment from one end thereof to the other, and means for measuring in operation the force which the fluid flowing through the pipe segment applies to at least some of such pipe segment as a result of Coriolis effect.

23 Claims, 13 Drawing Figures

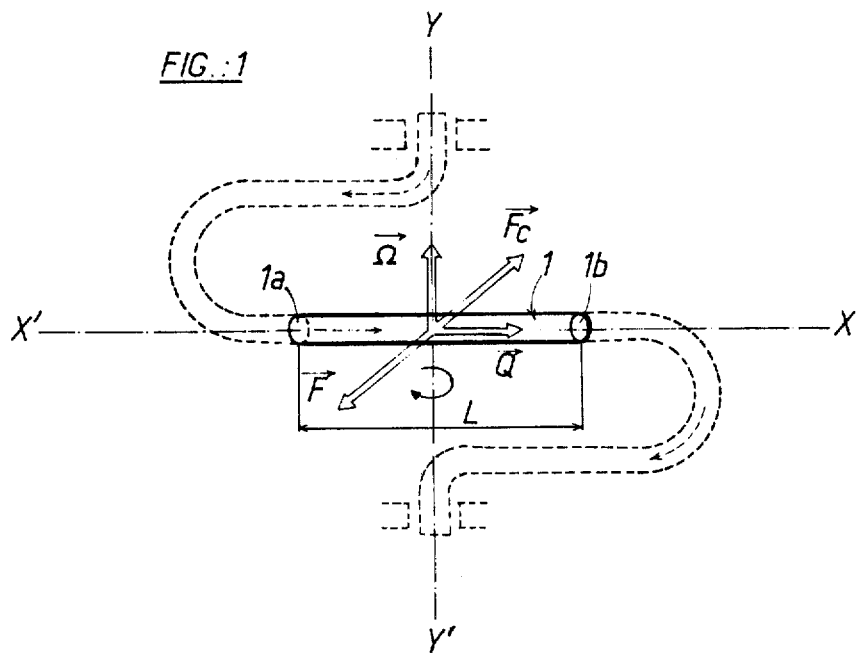
FIG.:1
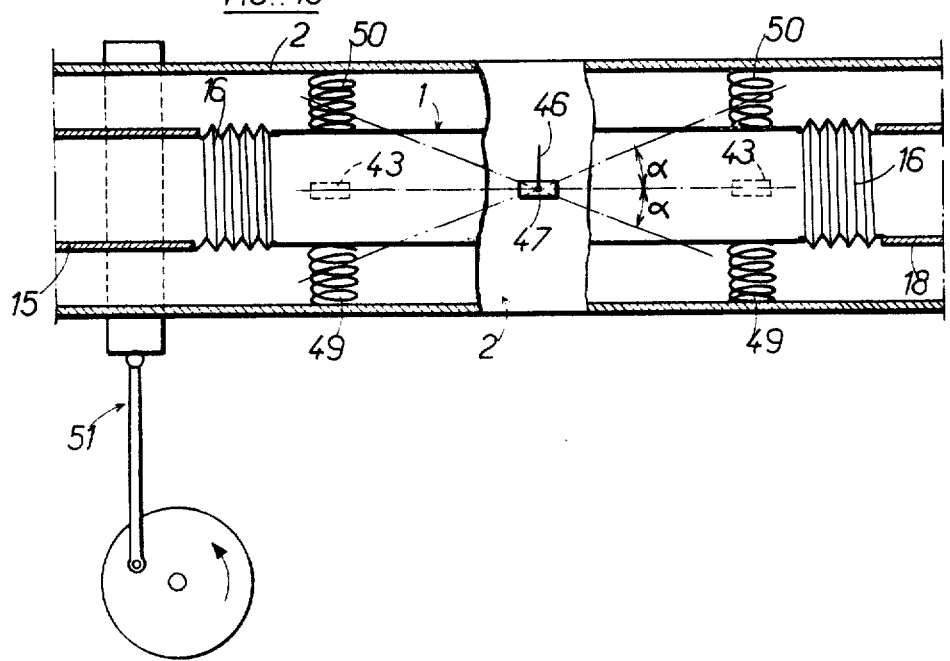
FIG.:10

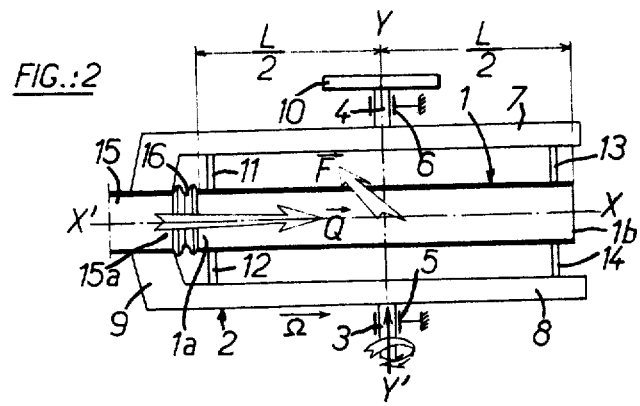
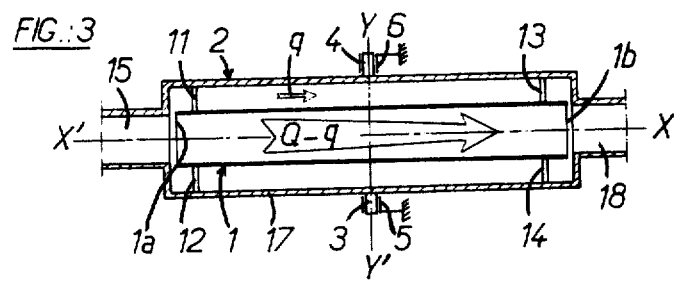
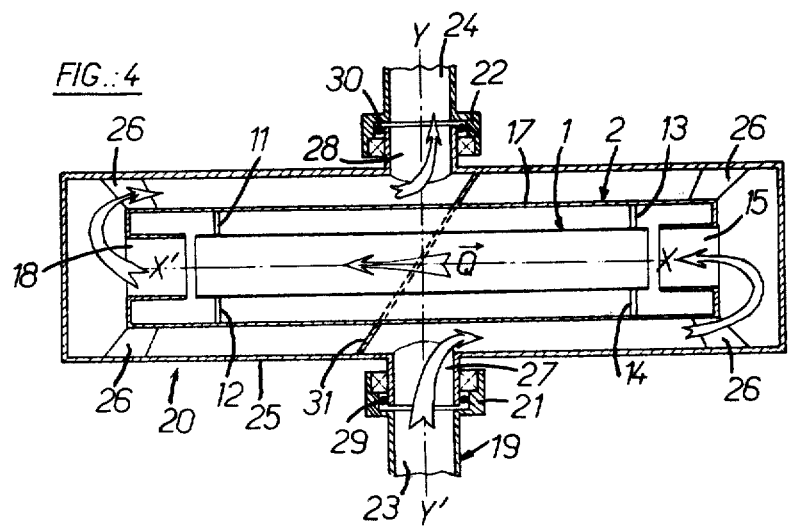

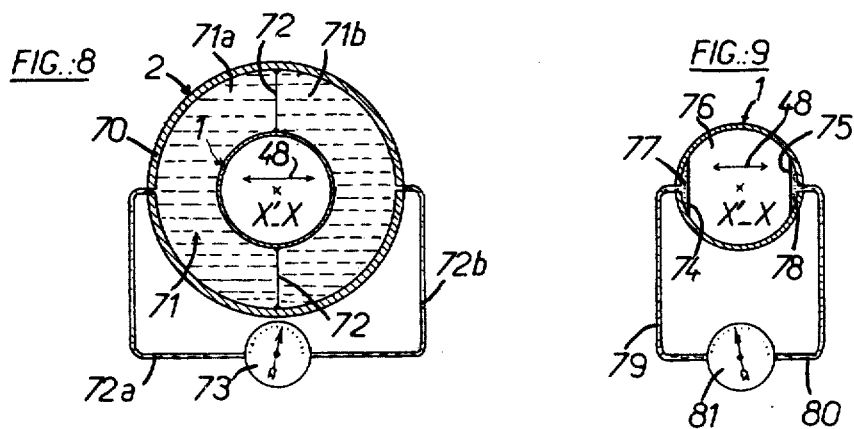
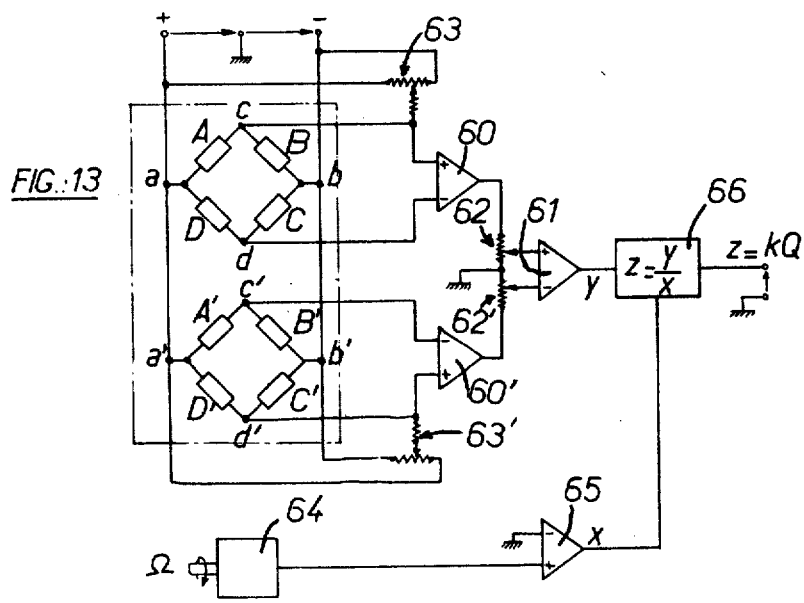

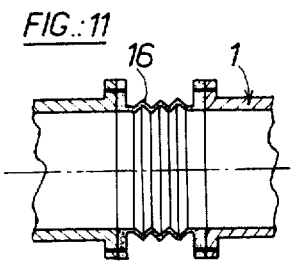
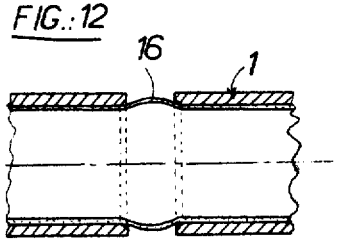
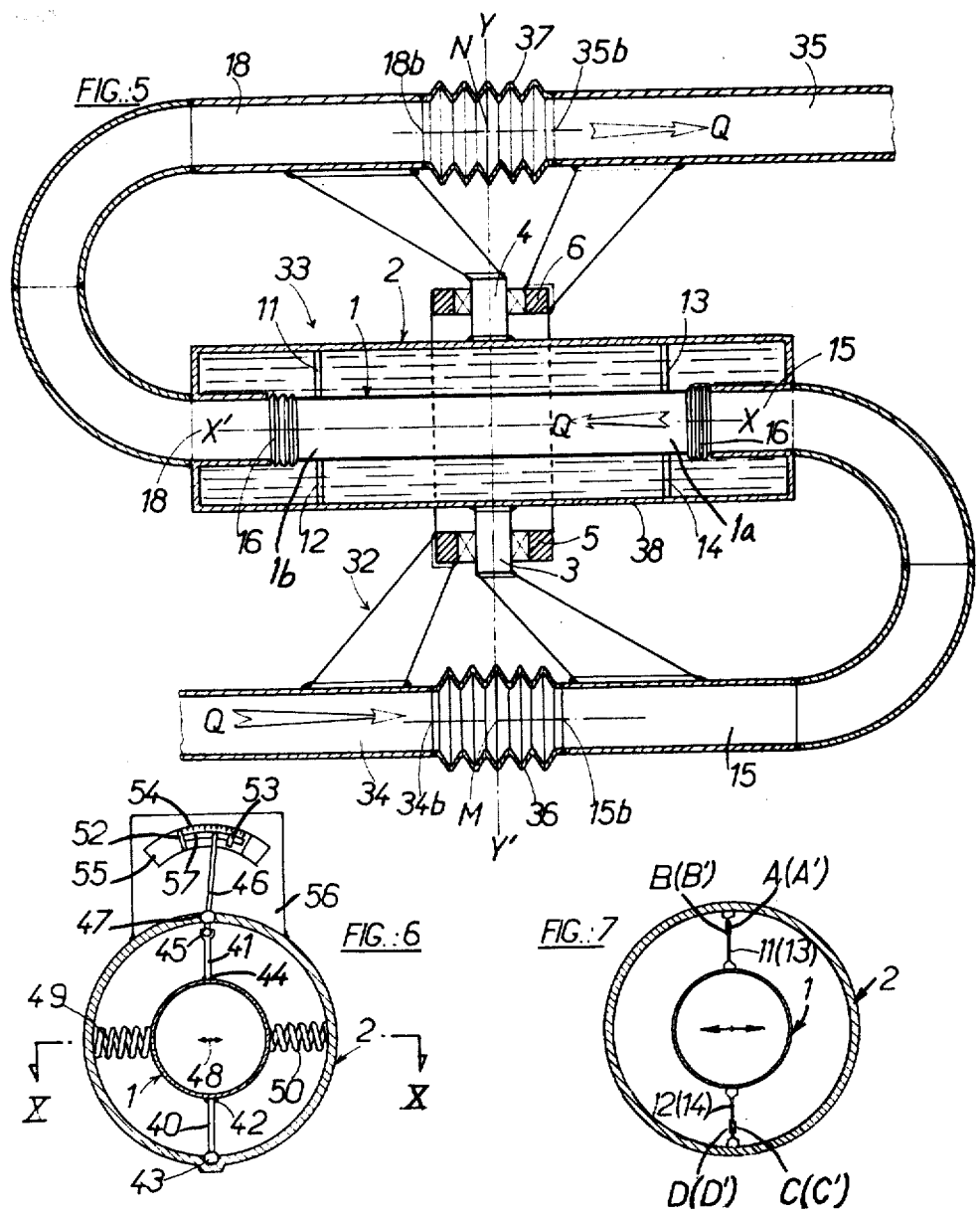

APPARATUS AND METHOD FOR MEASURING THE MASS FLOW OF A FLUID STREAM

This invention relates to an apparatus for measuring the mass flow of a stream of fluid and is of use more particularly, but not exclusively, for measuring the mass flow of substance issuing from an oil or natural gas well.

The term "fluid" as used in the remainder of the description and in the claims is intended to denote any flowing substance in any form — liquid or gaseous or solid, single-phase — as pure liquid — or polyphase — as liquid/solid or liquid/gas.

It has already been suggested that what is known as Coriolis effect or complementary acceleration be used to measure the mass flow of a flowing fluid. In known apparatuses of this kind, however, measurement of Coriolis effect is rendered difficult due to the interference of other disturbing effects which are difficult to suppress. The resulting apparatuses are therefore complex and fragile and also present to the fluid flow dead zones and corners which foul up rapidly and disturb the flow. Another serious disadvantage of the known apparatuses is that they cannot measure the mass flow of a polyphase fluid accurately and so are unsuitable for use in the oil industry.

It is an object of this invention to provide a Coriolis effect mass flow meter which is simple, rugged and cheap, can operate in very severe conditions, for instance, under water, can be introduced readily and without appreciable disturbance in the flow and can provide accurate measurement of the mass flow of a stream of polyphase fluid.

The apparatus according to the invention comprises, in its widest definition: a substantially rectilinear monochanneled pipe segment open at both ends and rotatable about an axis other than and not parallel to its longitudinal axis, means for rotating said pipe segment through a large angle (as defined hereinafter) about its rotational axis; means for making the fluid stream to be measured flow through said pipe segment from one end thereof to the other, and means for measuring in operation the force which the fluid stream flowing through said pipe segment applies to at least part of said pipe segment as a result of Coriolis effect. As will be seen hereinafter, the latter force is proportional to the mass flow which it is required to find.

For a better understanding of the invention and to show how the same may be carried into effect, reference may now be made to the accompanying drawings wherein:

FIG. 1 is a diagram showing the principle of operation of the flowmeter according to the invention;

FIGS. 2 to 9 show different embodiments of the flowmeter according to the invention;

FIG. 10 is a sectioned view (partly in elevation) on the line X—X, of the flowmeter shown in FIG. 6;

FIGS. 11 and 12 are sectioned views each showing a detail of the flowmeter according to the invention, and FIG. 13 is a circuit diagram of a measuring circuity associated with the flowmeter shown in FIG. 7.

Like reference numerals denote like elements throughout the drawings.

Referring to FIG. 1, a substantially rectilinear monochanneled open-ended pipe segment 1 having a longitudinal geometric axis X'–X is rotatable about a rotational axis Y'–Y; which is different from and non-parallel to the axis X'–X and is preferably substantially perpendicular thereto. The pipe segment 1 can be rotated through a large angle about the axis Y'–Y by means which are not shown. Such rotation can be either continuous —i.e., always in the same direction — or reciprocating — i.e., alternately first in one direction and then in the other. The fluid stream whose mass flow it is required to measure is made to flow through the pipe segment 1 from one end 1a thereof to the other end 1b by means which will be described hereinafter. The pipe segment 1 is monochanneled, i.e., defines a single channel to be traversed by the fluid stream.

The reference $\vec{Q}$ will be used hereinafter to denote the instantaneous mass flow vector of the fluid stream and the reference $\vec{\Omega}$ will be used hereinafter to denote the instantaneous rotation vector of the pipe segment 1. The vector $\vec{Q}$ has as its modulus the required-to-find value Q of the fluid mass flow, is coaxial of the axis X'–X of the pipe segment 1 and its direction depends upon the direction of fluid flow in said pipe segment 1. The vector $\vec{\Omega}$ has as modulus the value $\Omega$ of the angular velocity of the pipe segment 1, is coaxial of the rotational axis Y'–Y and its direction is determined by the direction of rotation of the pipe segment 1.

In operation, as a result of the combination of the two movements just mentioned — i.e., movement of the fluid relatively to the pipe segment 1 and rotation of said pipe segment relatively to a stationary datum position — the fluid flowing through the pipe segment 1 experiences a Coriolis effect force $\vec{F_c}$ which is defined in the relative datum considered (the pipe segment1) by the following expression:

$$F_c = 2L\, \vec{\Omega} \wedge \vec{Q}$$

in which $\vec{\Omega} \wedge \vec{Q}$ denotes the vectorial product of the vectors $\vec{\Omega}$ and $\vec{Q}$ and L denotes the length of the pipe segment 1.

The vector $\vec{F_c}$ is perpendicular to both of the vectors $\vec{\Omega}$ and $\vec{Q}$ — i.e., to both the geometric axis X'–X and the rotational axis Y'–Y of the pipe segment 1. The direction of the vector $F_c$ depends upon the direction of the vectors $\vec{\Omega}$ and $\vec{Q}$ and its modulus is equal to the product of the moduli of the vectors $\vec{\Omega}$ and $\vec{Q}$ multiplied by the sine of the angle between the two lastmentioned vectors. Ceteris paribus, therefore, the Coriolis force $\vec{F_c}$ is greatest when the rotational axis Y'–Y is perpendicular to the geometric axis X'–X of the pipe segment 1.

Conversely, the fluid flowing through the pipe segment 1 applies thereto by Coriolis effect a force $\vec{F} = -\vec{F_c} = -2L\, \vec{\Omega} \wedge \vec{Q}$. Clearly, therefore, the mass flow Q is proportional to the force F, and so if $\Omega$ is known, Q can be found by measuring F.

At this juncture it should be emphasized that the rotational movement of the pipe segment 1 must be of lareg angular amplitude if accurate measurement of the mass flow of a polyphase fluid, such as may issue from an oil or natural gas well, is required, as will now be explained hereinafter. It will be assumed that a travelling pocket of a different and denser kind of substance, such as a pocket of denser liquid in gas or a pocket of denser gravel, stones etc. in oil, presents at the entry of pipe segment 1. This travelling pocket, moves in a straight line by inertia and contacted the inner wall of said pipe segment 1, it is influenced little, if at all, by the rotation thereof and is thus not substantially affected by Cariolis effect.

Now if the rotation of the pipe segment 1 is of reduced angular amplitude (vibration), the zone "swept"

by its inner wall is small and there is therefore little, if any, effect on all the central zone of the flow (comprising in particular the pocket referred to), with the result that little, if any, account is taken of said pocket in mass-flow measurement.

If, however, in accordance with invention a rotation of large angular amplitude is imparted to the pipe segment the zone swept by the inside wall of said pipe segment covers the whole of the flow, missing nothing — i.e., in this case the mass flow measurement takes full account of the presence of the aforesaid pocket and is therefore accurate.

The large angular amplitude is produced automatically in the case of continuous (i.e., unidirectional) rotation, and the invention provides various embodiments using continuous rotation of the pipe segment 1.

In the case of reciprocating rotation — i.e., rotation first in one direction and then in the opposite direction — the angular amplitude must be such that the total (peak-to-peak) linear displacement of each of the pipe segment 1 is equal to or greater than the diameter of said pipe segment. Advantageously, said angular amplitude is at least ±10° and is, e.g. between ±10° and ±40°. Various forms of the invention are also devised for this case.

A description will now be given, with reference to FIGS. 2 to 13, of various forms of a mass-flow measuring apparatus according to the invention.

FIG. 2 shows a first embodiment wherein a support or carrying structure 2 is rotatably mounted by means of journals 3, 4 in stationary bearings 5, 6 which are coaxial of the rotational axis Y'-Y. Support structure 2 may comprise e.g. two longitudinal arms 7, 8 interconnected by a cross-arm 9, and can be rotated about the axis Y'-Y either continuously or reciprocatingly through a wide angle by means of an appropriate drive facility 10. The rotational axis Y'-Y may be vertical or horizontal.

The rectilinear monochanneled pipe segment is suspended on the two arms 7, 8 symmetrically about the rotational axis Y'-Y by means of four resilient strips 11 - 14 each secured at one end to the pipe segment 1 and at the other end to one or other of the arms 7, 8. Consequently, in this arrangement the axis X'-X of the pipe segment 1 is substantially perpendicular to the rotational axis Y'-Y of the system comprising the pipe segment 1 and the support structure 2 (7 — 8— 9).

Advantageously, the plane defined by the axes X'-X, Y'-Y is vertical.

The form of suspension shown results in the rectilinear pipe segment 1 having a degree of freedom relatively to the support structure 2 (7 — 8— 9), such that said pipe segment 1 can perform as a whole a translational movement relatively to such structure in a direction having a component perpendicular to both of the axes X'-X and Y'-Y — i.e., parallel to the direction of the force $\vec{F}$ which the fluid applies by Coriolis effect to the pipe segment 1 in operation.

The strips 11 - 14 also serve as means for resiliently returning the pipe segment 1 to an initial normal position (visible in FIG. 7) relatively to the support structure 2.

Of course, the resilient strip suspension system may be replaced by any other equivalent suspension system providing an appropriate degree of freedom, such as the device which is shown in FIGS. 6 and 10 and which comprises pivoted arms and springs.

A fluid inlet tube 15 is rigidly secured to the cross-arm 9 and has an open end 15a which is disposed in register with the open end 1a of the pipe segment and which is separated from the latter end by a slight gap or clearance which may be sealingly filled by means of a flexible coupling 16, such as bellows which are disposed between the facing open ends 1a, 15a, as shown in FIG. 11, or a flexible sleeve, for instance, of an elastomeric substance, which sticks to the tube 15 and the pipe segment 1, as shown in FIG. 12.

In operation, the fluid stream whose mass flow Q it is desired to measure passes seriatim through the integers 15, 1, and the system formed by the elements integers 2, 15, 1 experiences a continuous or reciprocating rotation about the axis Y'-Y. Due to Coriolis effect, the fluid flowing through the pipe segment 1 applies thereto a force F which tends to translationally shift the whole pipe segment 1 relatively to the support structure 2 and parallel to itself in the direction previously defined. If the movement or shift of a pipe segment 1 is measured (in the manner to be described hereinafter with reference to FIGS. 6 and 10) or the distortion of the resilient suspension strips 11 - 14 is measured (as will be described hereinafter with reference to FIGS. 7 and 13) or if any other equivalent means are used, the force F can be measured and from it the value Q of the mass flow of the fluid stream through the pipe segment 1 can be deduced.

In the variant shown in FIG. 3, the support structure 2 comprises a pressure-tight enclosure 17 to which a fluid inlet tube 15 and fluid outlet tube 18 are rigidly fixed. In this variant there is no coupling (similar to the flexible sealing coupling 16) to fill the gap between the open ends 1a and 1b of the pipe segment 1 and the said inlet tube and outlet tube, respectively, and so a small proportion q of the fluid stream leaks around the pipe segment 1. The advantage of this system is that the pressures on either side of the wall of the pipe segment 1 can be equalized. The pipe segment 1 can therefore be thinner and therefore lighter than in the previous embodiments, thus helping to increase the sensitivity of the measuring apparatus and to reduce its response time, although this advantage is offset by a slight measurement error due to the leakage flow q. In a variant (not shown), the leakage flow can be reduced, while retaining substantially all of the advantages of pressure equalization, by closing just the gap at the inlet 1a of the pipe segment 1 by means of a coupling, such as the flexible coupling 16 previously described.

In the variant embodiment shown in FIG. 4, of use more particularly for continuous unidirectional rotation of the rectillinear mono-channeled pipe segment 1, there can be seen a stator 19 and a rotor 20. The stator 19 comprises inter alia two bearings 21, 22 coaxial of the rotational axis Y'-Y and respectively located at the free open end of a stationary inlet tubular duct 23 and a stationary outlet tubular duct 24. Rotor 20 comprises an outer casing 25 inside which the system formed by the elements 2, 1, 15, 18 is rigidly secured by means of arms 26. In the example shown, the support structure 2 comprises, as previously described with reference to FIG. 3, a pressure-tight enclosure or inner casing 17 to which the inlet and outlet tubes 15, 18 are connected. Rotor 20 also comprises two tubular journals 27, 28 which are coaxial of the axis Y'-Y and via which the rotor 20 is borne in the bearings 21, 22. Each journal 27, 28 is rigidly fixed to the outer casing 25 and communicates with the inside of said outer casing. Each journal 27, 28 has a free open end in axial register with the free open end of a corresponding stationary ducts 23 or 24. A sealing-tight engagement between the journals 27, 28 and the bearings 21, 22 is provided by rotating seals 29, 30. A partitioning wall 31 sealingly divides the intermediary space defined between the outer casing 25 and the inner casing 17 into first and second rotor compartments respectively communicating with the inside of the tubular journals 27, 28 and 25 ensures that the fluid flows along the path 23, 27, 15, 1, 18, 28, 24.

Although of use more particularly for continuous unidirectional rotation, the variant just described could also be used for reciprocating rotation of the pipe segment 1. This variant is of use for measuring the mass-flow of a stream of single-phase or polyphase fluid. In the latter case, the fluid should preferably be free from suspended solid particles, since there may be a risk of solid deposits accumulating is some zones of rotor 20 as a result of the many changes in direction which the fluid undergoes in the rotor and as a result of the presence of the slight clearance at the entry to and exit from the pipe segment 1.

FIG. 5 shows a variant, embodiment of use more particularly for reciprocating rotation, preferably at a low frequency, of the rectilinear monochanneled pipe segment 1. There can be seen a stator 32 and rotor 33. The stator 32 comprises inter alia two bearings 5, 6 coaxial of the rotational axis Y'-Y, a stationary fluid inlet duct 34 and a stationary fluid outlet duct 35. Rotor 33 is embodied by a system comprising structure 2, pipe segment 1, and the fluid inlet 15 tube and outlet tube 18 and also comprises two journals 3, 4 which are coaxial of the rotational axis Y'-Y and via which the rotor 33 is borne in the bearings 5, 6.

As can be seen in FIG. 5, the rotor tubes 15, 18 each comprise a 180° bend so as to be disposed in series with stationary stator ducts 34, 35 respectively. The rotor tube 15 (18) is formed with an open end 15b (18b) which faces a corresponding open end 34b (35b) of the stationary duct 34 (35). The mutually-facing open ends 15b–34b (18b–35b) are situated on either side of the rotational axis Y'-Y and their respective geometric axes are coplanar with said rotational axis Y'-Y so as always to intersect one another at a single point M (N) on the last-mentioned axis. The mutually-facing open ends 15b, 34b (18b—35b) are sealingly interconnected by way of a coupling means, such as a flexible seal coupling 36 (37), which simultaneously articulates the rotor duct 15 (18) with the corresponding stator duct 34 (35) for rotation about said axis Y'-Y. The rotor 33 (2 — 3— 4 — 15 — 18) can therefore reciprocatingly rotate relatively to the stator 32 (5 — 6 — 34 — 35) with such an amplitude that the total linear displacement of each end 1a, 1b of tfhe rectilinear pipe segment 1 is at least equal to the diameter of said pipe segment, while allowing the fluid to flow in series through the items forming the path 34, 15, 1, 18, 35.

The rotor tubes 15, 18 are connected to the rectilinear pipe segment member 1 by flexible sealing couplings 16 similar to those shown in FIGS. 1, 11 and 12. Support Structure 2 comprises a hermetic casing 35 filled with incompressible liquid which surrounds the pipe segment 1 and the sealing couplings 16, so that said sealing couplings can withstand the pressure of the flowing fluid. The incompressible liquid is preferably chemically inert and an electrical insulator, to facilitate the use of an electrical measurement circitry which will be described with reference to FIGS. 7 and 13.

This variant embodiment may be used for measuring the mass-flow of any single-phase or polyphase fluid which can even contain suspended solids, since the risk of solid deposits accumulating in zones of the rotor 33 is much less than in the case of the embodiment described with reference to FIG. 4, first because the fluid undergoes fewer changes in direction, and second because of the presence of the hermetic seals 16 at both ends of the pipe segment 1.

In a variant embodiment shown in FIGS. 6 and 10, the rectilinear monochanneled pipe segment 1 is suspended on the support structure 2 by means of three arms, namely, two end-arms 40 and one median arm 41. Each end arm 40 is secured at one end 42 to an end-region of the pipe segment 1 and is pivoted at its other end 43 to the support structure 2. Median arm 41 is secured at one end 44 to the pipe segment 1 and is pivoted at its other end to one end 45 of a needle or pointer 46 which is pivoted at a place 47 to the structure support 2. With this form of suspension, the pipe segment 1 has freedom of translational movement in the (preferably horizontal) direction indicated by a double arrow 48 (see FIG. 6), such direction being the direction of the Coriolis effect force which the fluid applies to the said pipe segment.

Two helical springs 49, 50 are secured near each of the two ends of the pipe segment 1; each such spring is secured at one end to the pipe segment 1 and at the other end to the support structure 2 and provides a resilient return of said pipe segment to an initial normal position in the same direction 48.

In operation, the fluid flowing through the rectilinear pipe segment 1 applies thereto as a result of Coriolis effect a force tending to translationally move said pipe segment in one or the other of the two directions indicated by the double arrow 48, against the force of the springs 49, 50. This translational movement can be measured by means of the needle or pointer 46.

In the example shown, it has been assumed that the system 2, 1 is rotated reciprocatingly (oscillated) through an angle α by means of an appropriate drive mechanism 51; consequently, as a result of Coriolis effect, the pipe segment 1 experiences a force operative alternately first in one direction and then in the opposite direction, as a result of which force said pipe segment performs a reciprocating translational movement, first in one direction, and then in the other, relatively to the support structure 2. The peak-to-peak amplitude of this reciprocating translational movement can be measured by the facility shown in FIG. 6. As previously stated, the angular amplitude α of oscillation is such that the total (peak-to-peak) linear displacement of each of the two ends of the pipe segment 1 is greater than the diameter thereof. Preferably, such angular amplitude is greater than ±10° from the mean position of the pipe segment 1 and is, with advantage, between ±10° and ±40°. These comments also apply of course to FIGS. 4 and 5.

Needle 46 cooperates with a measuring system comprising inter alia two sliders or cursors 52, 53; slider 52 is rigidly secured to a scale 54 movable in a groove 55 in a panel 56 rigidly secured to support structure 2, scale 54 itself being formed with a groove 57 in which slider 53 can move. In operation, needle 46 strikes slider 52 and slider 53 consecutively so that the peak-to-peak amplitude of the reciprocating translational movement of pipe segment 1 can be read directly on scale 54, thus making it possible to deduce the required-to-be-found value Q of the mass flow.

In a variant shown in FIG. 7, the means for resiliently returning the pipe segment 1 comprise at least two, and preferably four, resilient strips 11 –14 which can be deformed by bending and each of which carries on each of its two faces a strain gauge, e.g. of the resistance type, responsive to deformation of the particular strip concerned. The four gauges associated with the strip pair 11, 12 disposed in one of the end zones of the pipe segment 1 will hereinafter be called A, B, C, D, and the four gauges associated with the strip pair 13, 14 disposed in the other end zone of the pipe segment 1 will hereinafter be called A', B', C', D'.

FIG. 13 shows an electrical measurement circuitry for processing the data received by means of the strain gauges so as to calculate the mass flow Q of the stream fluid flowing through the pipe segment 1. This circuitry comprises a first Wheatstone bridge circuit having connected in its four arms the four strain gauges, A, B, C, D associated with one of the pairs of resilient strips 11, 12, and a second Wheatstone bridge circuit having connected in its four arms the four strain gauges A', B', C', D' associated with the other pair of resilient strips 13, 14.

A d.c. voltage is applied to each bridge across its terminals $a$ and $b$ ($a'$ and $b'$) and each bridge delivers at its terminals $c$ and $d$ ($c'$ and $d'$) voltage signal whose modulus and sign depend upon the resistances of the gauges A, B, C, D (A', B', C', D') and therefore on the distortions of such gauges. Such distortions in turn depend upon the nature and the extent of the movements experienced in operation by the pipe member 1 relatively to the support structure 2.

Associated with each of the two bridges A, B, C, D (A', B', C', D') is differential amplifier 60 (60') which is connected across the output terminals $c, d$ ($c', d'$) of the bridge. The connection is direct for one of the amplifiers, e.g. the amplifier 60, and reversed for the other.

The output signals of the two amplifiers 60, 60' are applied to a processing facility comprising inter alia a differential amplifier 61 connected via two potentiometers 62, 62' to the outputs of amplifiers 60, 60'. Consequently, the system of amplifiers 60, 60', 61 shown enables the amplifier 61 to deliver a signal $y$ which is a function of the algebraic sum of the output signals delivered by the two Wheatstone bridges. In this connection, it may be noted that for translational movement of the pipe segment 1 parallel to itself in the direction of the Coriolis force, the output signals from the two amplifiers 60, 60' are of opposite sign. In this case the two signals applied to the amplifier 61 must also be equal in absolute value, and this can be achieved by pre-adjustment of the potentiometers 62, 62'.

The signal y represents nothing but the Coriolis effect force which the fluid stream flowing through the pipe segment 1 applies thereto; the bridge arrangement A B C D (or A'B'C'D') removes any interfering signal likely to be produced by rotation of the pipe segment 1 about its geometric axis X'-X, while the arrangement of the two bridges A B C D, A'B'C'D', one of which is connected invertedly to the amplifier 60 (or 60'), helps to suppress any interfering signal due to transmission of the rotation torque (about the axis Y'-Y) from the support 2 to the pipe segment 1 via the resilient strips 11 – 14. Positioning the strips 11 – 14 vertically suppresses the effect of gravity on measurements.

The measuring circuitry may also have two potentiometers 63, 63' which are so pre-adjusted that in the normal state — i.e., in the absence of any deformation of the strips 11 – 14 — no signals are injected into the amplifiers 60, 60'.

The measuring circuitry shown in FIG. 13 also comprises a tachometer 64 which, in association with an amplifier 65, serves to deliver a signal $x$ which is a function of the instantaneous angular velocity $\Omega$ of the pipe segment 1 about its rotational axis Y' –Y. The division $z = y/x$ can be made by a function generator 66 for directly obtaining the required-to-find value Q of the mass flow, since:

$$z = \frac{y}{x} = \frac{k_1 \cdot F}{k_2 \cdot \Omega} = \frac{k_1 \cdot 2L\Omega Q}{k_2 \cdot \Omega} = kQ,$$

$k_1$, $k_2$ and $k$ being known constants depending only on the measuring device.

This relationship holds for continuous unidirectional rotation as well as for reciprocating rotation. In the latter case $\Omega$ and F vary sinusoidally but always cophasally, so that the relationship $F/\Omega$ remains constant for a given rate of flow Q.

Also, a reciprocating movement helps to eliminate by difference all the d.c. components of the force measurement which are due to a gravity component, assymetrical flow, prestressing of the resilient strips or electric imbalance of the guage bridges.

In another variant of the invention, shown in FIG. 8, support structure 2 comprises a casing 70 which bounds a hermetic enclosure 71 aroung the rectilinear pipe segment 1. A hermetic deformable wall, such as a diaphragm 72, is secured to pipe segment 1 and to casing 70 and extends substantially diammetrically and parallel to the geometric axis X'-X of the pipe segment and subdivides enclosure 71 into two chambers 71a, 71b each filled with an auxiliary fluid, such as a liquid. This form of suspension gives the pipe segment 1 freedom of translational movement in the direction which is indicated by the double arrow 48 and which is the direction of the force which the fluid applies to the pipe segment 1 as a result of Coriolis effect. Each chamber 71a, 71b communicates via a duct 72a, 72b with one of the faces of a differential pressure gauge 73.

Normally, the auxiliary-fluid pressures in the two chambers 71a, 71b are equal, and so the differential pressure indicated by gauge 73 is zero. In operation, the pipe segment 1 tends to move in one or other of the directions indicated by the double arrow 48, so that pressure increases in one of the chambers and decreases in the other. The differential pressure indicated on the pressure gauge 73 therefore provides a measurement of the force which the fluid stream flowing through the pipe segment 1 applies thereto as a result of the Coriolis effect. If this force and the rotational velocity $\Omega$ are known, the required-to-find value Q of the fluid mass flow can be deduced.

In another variant, shown in FIG. 9, the rectilinear pipe segment 1 is divided internally over at least some of its length by two deformable hermetic partitions 74, 75, extending substantially parallel to the geometric axis X'-X, into a central channel 76 and two hermetic chambers 77, 78 disposed laterally on either side said central channel 76. The fluid stream whose mass-flow Q it is required to measure flows through the central channel 76. Each of the two hermetic chambers 77, 78 is filled with an auxiliary fluid, such as a liquid. Each of the two chambers 77, 78 communicates via a passage 79, 80 with one of the faces of a differential pressure gauge 81.

Normally, the auxiliary-fluid pressures in the two chambers 77, 78 are equal and so the gauge 81 indicates zero difference pressure. In operation the fluid stream flowing through the central channel 76 applies a force in one or other of the two directions indicated by the double arrow 48 to one or other of the deformable partitions 74, 75 bounding the channel 76, as a result of the Coriolis effect. Consequently, pressure rises in one of the two chambers 77, 78 and decreases in the other. Consequently, the required-to-find value Q of the fluid mass flow can be calculated from the difference pressure indicated by the gauge 81, as in the previous case.

The various embodiments of a mass-flow measuring apparatus hereinbefore described are simple, accurate, rugged and cheap. It should also be noted that this apparatus may be made up of tubular elements (such as 15, 18, 1) of the same diameter as the tubes which normally convey the fluid stream, so that insertion of said apparatus in the fluid stream causes no appreciable disturbance thereof.

The embodiments described are of course only examples and may be modified, inter alia by the substitution of technical equivalents, without for that reason departing from the scope of the invention as defined in the appendant claims.

We claim:

1. In an apparatus for measuring the mass-flow of a stream of single-phase or polyphase fluid, comprising:
   a stator;
   a rotor mounted for rotation relatively to said stator about a rotational axis, said rotor including:
      a support structure;
      a substantially rectilinear monochanneled pipe segment presenting a longitudinal axis substantially perpendicular to said rotational axis, said pipe segment having two open ends and being traversed in operation by said fluid stream, from one end thereof to the other;
      means for suspending said rectilinear pipe segment on said support structure substantially symmetrically about said rotational axis and with a degree of freedom such that said rectilinear pipe segment can perform as a whole a translational movement relatively to said support structure in a direction perpendicular to both the longitudinal axis of said rectilinear pipe segment and said rotational axis;
      means for reciprocatingly rotating said rotor relatively to said stator about said rotational axis; and
      means for measuring in operation the force which said fluid stream applies to said rectilinear pipe segment as a result of Coriolis effect in said direction in which said pipe segment has translational freedom relatively to said support structure;
   in combination, the improvement comprising an inlet system for admitting said fluid stream into and an outlet system for discharging said fluid stream out of said rectilinear pipe segment, said inlet and outlet systems each comprising:
      a two-ended rotor tube rigidly fixed to said support structure and comprising a 180° bend, said rotor tube having a first open end in register with an open end of said rectilinear pipe segment, and a second open end;
      a stationary stator duct having an open end; and
      coupling means sealingly interconnecting said second open end of the rotor tube with said open end of the stator duct and simultaneously articulating said rotor tube with said stator duct for rotation about said rotational axis;
   whereby allowing said rotor to perform a reciprocating rotation such that the total linear displacement of each end of said rectilinear pipe segment is at least equal to the diameter of said pipe segment.

2. An apparatus according to claim 1, wherein said second open end of the rotor tube and said open end of the stator duct both face said rotational axis and are situated on either side said rotational axis respectively, and said coupling means comprise a flexible coupling.

3. An apparatus according to claim 1, wherein said first open end of the rotor tube which is in register with an open end of said rectilinear pipe segment is separated from the latter open end by a reduced gap.

4. An apparatus according to claim 3, further comprising a flexible coupling sealingly interconnecting said rotor tube with said rectilinear pipe segment whereby to fill said reduced gap.

5. An apparatus according to claim 4, wherein said support structure comprises a hermetic casing full of liquid disposed around said flexible coupling.

6. An apparatus according to claim 1, wherein said suspension means comprise deformable walls.

7. An apparatus according to claim 1, further comprising means for resiliently returning said rectilinear pipe segment to an initial normal position relatively to said support structure.

8. An apparatus according to claim 7, wherein said resilient return means are merged with said means for suspending said rectilinear pipe segment.

9. An apparatus according to claim 7, wherein said resilient return means comprise at least one spring secured at one end to said rectilinear pipe segment and at the other end to said support structure.

10. An apparatus according to claim 9, wherein said spring comprises a resilient strip deformable by bending.

11. An apparatus according to claim 7, wherein said Coriolis force-measuring means comprise means for measuring the translational movement of said rectilinear pipe segment relatively to said support structure, said movement being in said direction in which said pipe segment has translational freedom relatively to said support structure and against the force of said return means.

12. An apparatus according to claim 11, wherein said movement measurement means comprises means for measuring the peak-to-peak amplitude of a reciprocating translational movement experienced by said rectilinear pipe segment relatively to said support structure as a result of a Coriolis force acting alternately first in one direction and then in the opposite direction, as a consequence of the reciprocating rotation of said rotor.

13. An apparatus according to claim 10, wherein said Coriolis force-measuring means comprise at least one strain gauge placed on said resilient strip and sensitive to deformation thereof.

14. An apparatus according to claim 13, wherein said resilient return means comprise at least one pair of resilient strips having each a strain gauge on each of its two faces, the total number of strain gauges associated with said pair thus being four.

15. An apparatus according to claim 14, further comprising an electrical measurement circuitry including a Wheatstone bridge circuit having connected in its four arms the respective four strain gauges associated with said pair of resilient strips, said bridge delivering an output signal when said rectilinear pipe segment moves relatively to said support structure, and processing means adapted to be fed by said output signal.

16. An apparatus according to claim 15, wherein said resilient return means comprise two pairs of resilient strips, viz. a first pair associated with one of the end zones of said rectilinear pipe segment, and a second pair associated with the other end zone of said pipe segment, and said electrical measurement circuitry comprises a first Wheatstone bridge circuit associated with said first pair of resilient strips and a second Wheatstone bridge circuit associated with said second pair of resilient strips, said processing means being adapted to be fed simultaneously by the output signals delivered by said two Wheatstone bridges.

17. An apparatus according to claim 16, wherein said processing means comprise means for producing a signal which is a function of the algebraic sum of the output signals delivered by said two Wheatstone bridges.

18. An apparatus according to claim 15, further comprising means for delivering a signal which is a function of the angular velocity of said rectilinear pipe segment about said rotational axis, and wherein said processing means are adapted also to be fed by said velocity signal.

19. An apparatus according to claim 1, wherein said support structure comprises a casing bounding a hermetic enclosure around said rectilinear pipe segment; wherein said means for suspending said pipe segment on said support structure comprise a hermetic deformable wall secured to said pipe segment and to said casing, said deformable wall extending substantially parallel to the axis of said rectilinear pipe segment and subdividing said hermetic enclosure into two chambers each of which is filled with an auxiliary fluid; and wherein said Coriolis force-measuring means comprise means for measuring the difference between the auxiliary fluid pressures in the two chambers.

20. An apparatus for measuring the mass-flow of a stream of fluid, comprising in combination:
a stator including:
first and second tubular ducts having each a free open end; and
first and second bearings located on said free open end of a respective tubular duct and together defining a rotational axis;
a rotor mounted for rotation relatively to said stator about said rotational axis and including:
first and second rotor tubular journals coaxial of said rotational axis and by way of which said rotor is borne in said bearings, each said tubular journal having a free open end in axial register with said free open end of a respective tubular duct;
a rotor outer casing rigidly fixed to said tubular journals and the inside of which communicates with the inside of said tubular journals;
a rotor inner casing rigidly fixed to and located within said outer casing whereby to define therewith an intermediary space, said inner casing having first and second spaced-apart end openings registered in a longitudinal direction substantially perpendicular to said rotational axis;
partitioning wall means sealingly dividing said intermediary space into first and second rotor compartments communicating with the inside of said first and second tubular journals respectively, each compartment also communicating with the inside of said inner casing via a respective end-opening of said inner casing;
a substantially rectilinear monochanneled pipe segment located within said rotor inner casing and extending in said longitudinal direction, said pipe segment having first and second open ends in substantial register with said first and second end-openings of the inner casing respectively;
means for suspending said rectilinear pipe segment to said rotor inner casing substantially symmetrically about said rotational axis and with a degree of freedom such that said rectilinear pipe segment can perform as a whole a translational movement relatively to said inner casing in a direction perpendicular to both said longitudinal direction of the pipe segment and said rotational axis;
said stator and rotor together defining for said fluid stream a path comprising in succession said first stator tubular duct, said first rotor tubular journal, said first rotor compartment, said first end-opening of the rotor inner casing, said rectilinear pipe segment from the first end thereof to the second, said second end-opening of the rotor inner casing, said second rotor compartment, said second rotor tubular journal, and said second stator tubular duct;
means for rotating said rotor relatively to said stator about said rotational axis; and
means for measuring in operation the force which said fluid stream applies to said rectilinear pipe segment as a result of Coriolis effect in said direction in which said pipe segment has translational freedom relatively to said rotor inner casing.

21. An apparatus for measuring the mass-flow of a stream of fluid, comprising in combination:
a substantially rectilinear pipe segment mounted for rotation about a rotational axis substantially perpendicular to its longitudinal axis;
two deformable hermetic partitions located within said pipe segment substantially parallel to said longitudinal axis thereof and together bounding with said pipe segment:
a central channel having two open ends and traversed in operation by said fluid stream from one end thereof to the other; and
two hermetic chambers disposed laterally on either side said central channel and each of which is filled with an auxiliary fluid;
means for rotating said rectilinear pipe segment about said rotational axis; and
means for measuring the force which said fluid stream flowing through said central channel experiences as a result of Coriolis effect, said force-measuring means comprising means for measuring the difference between the auxiliary fluid pressures in said two hermetic chambers.

22. A method for measuring the mass-flow of a stream of polyphase fluid, comprising the steps of:
reciprocatingly rotating about a rotational axis a support structure on which a monochanneled rectilinar two-ended pipe segment the longitudinal axis of which is substantially perpendicular to said rotational axis, is suspended substantially symmetrically about said rotational axis and with a degree of freedom such that said pipe segment can perform as a whole a translational movement with respect to said support structure in a direction perpendicular to both said longitudinal axis and said rotational axis, with an angular amplitude such that the total linear displacement of each end of said pipe segment is at least equal to the diameter of said pipe segment;

making said stream of polyphase fluid flow through said rectilinear pipe segment from one end thereof to the other; and measuring the force which said stream of polyphase fluid applies to said pipe segment as a result of Coriolis effect in said translational direction.

23. A method for measuring the mass-flow of a stream of fluid, comprising the steps of:

continuously rotating unidirectionally about a rotational axis a support structure on which a monochanneled rectilinear two-ended pipe segment the longitudinal axis of which is substantially perpendicular to said rotational axis, is suspended substantially symmetrically about said rotational axis and with a degree of freedom such that said pipe segment can perform as a whole a translational movement with respect to said support structure in a direction perpendicular to both said longitudinal axis and said rotational axis;

making said stream of fluid flow through said rectilinear pipe segment from one end thereof to the other; and measuring the force which said stream of fluid applies to said pipe segment as a result of Coriolis effect in said translational direction.

* * * * *